April 21, 1931.  E. ARREA  1,801,619
GYROSCOPIC COMPASS AND LATITUDE INDICATOR
Filed March 13, 1928  3 Sheets-Sheet 1
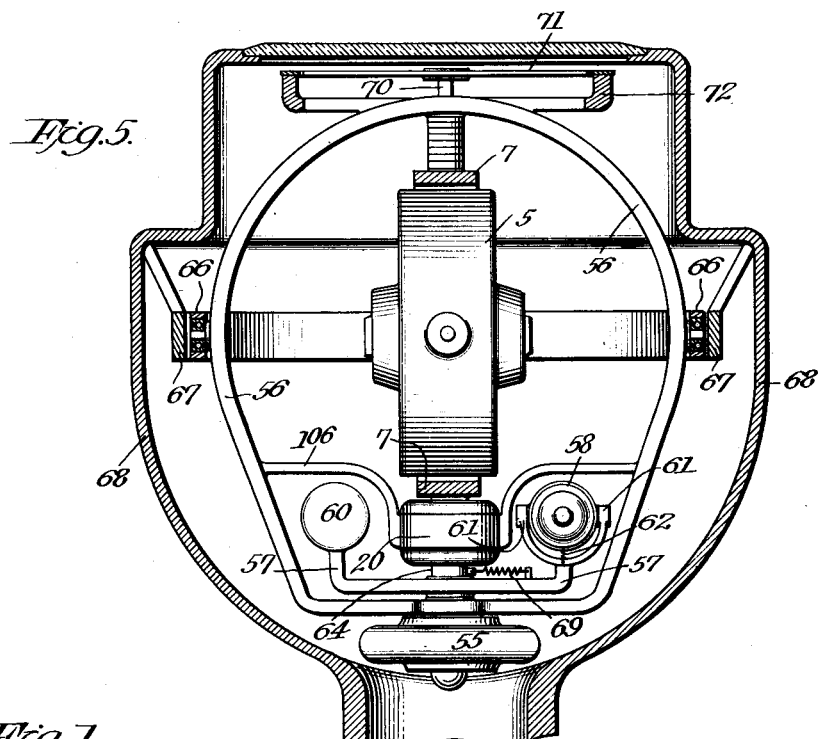
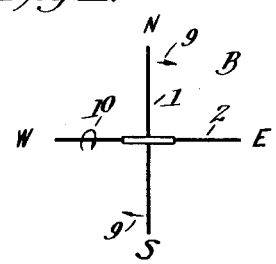
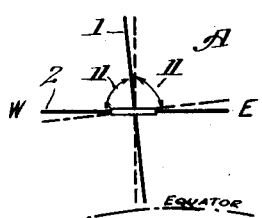
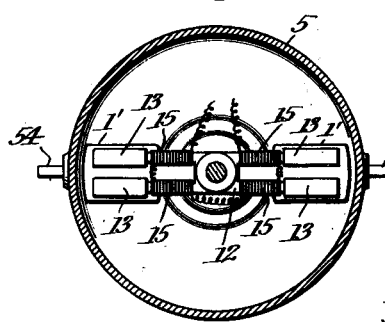
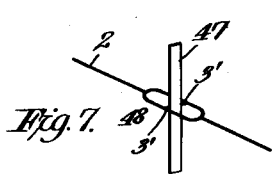
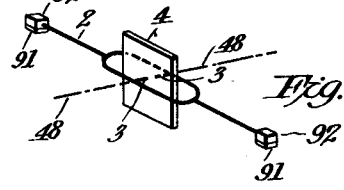
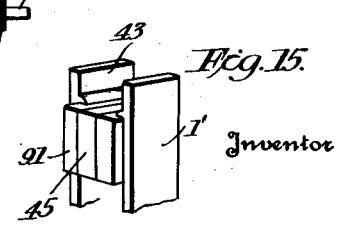

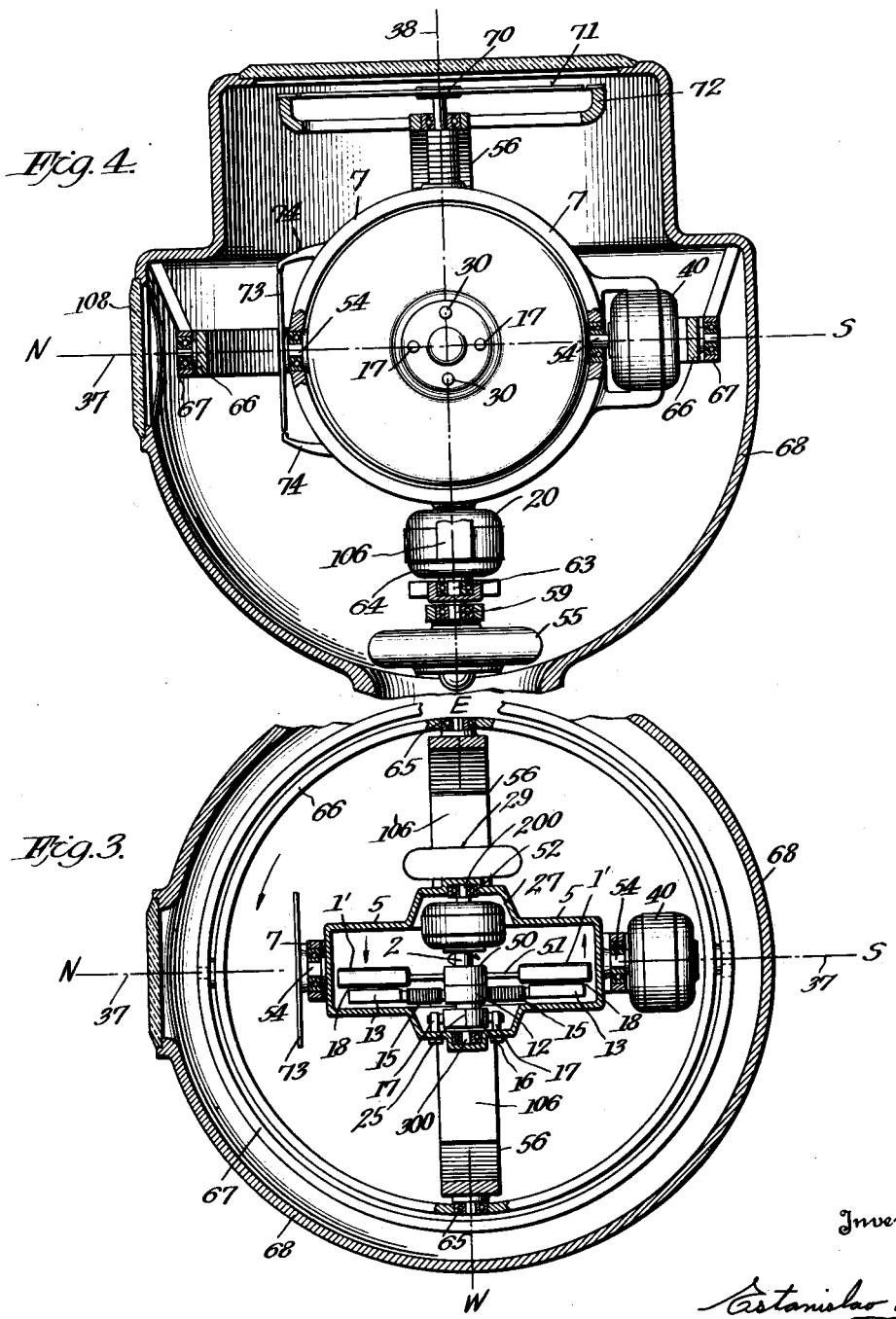

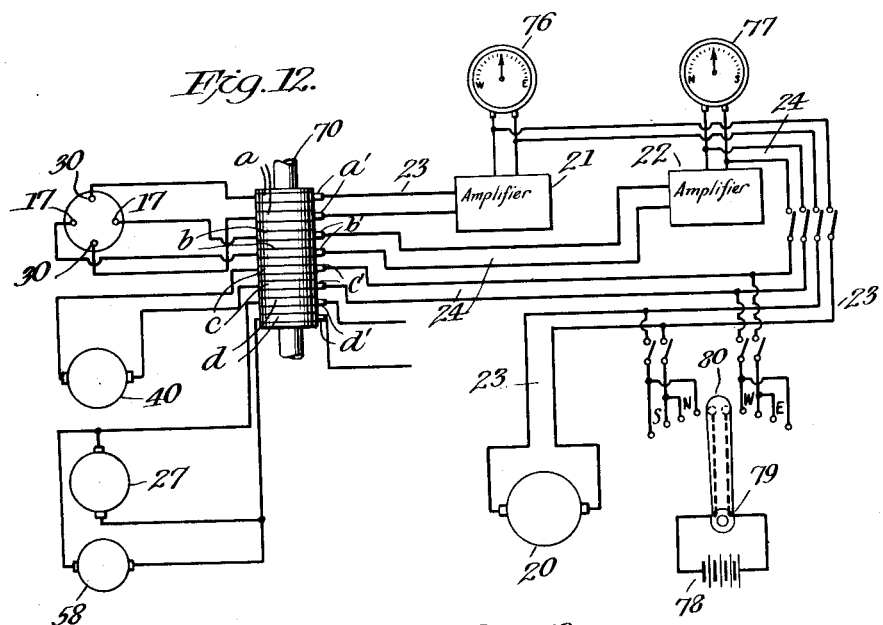
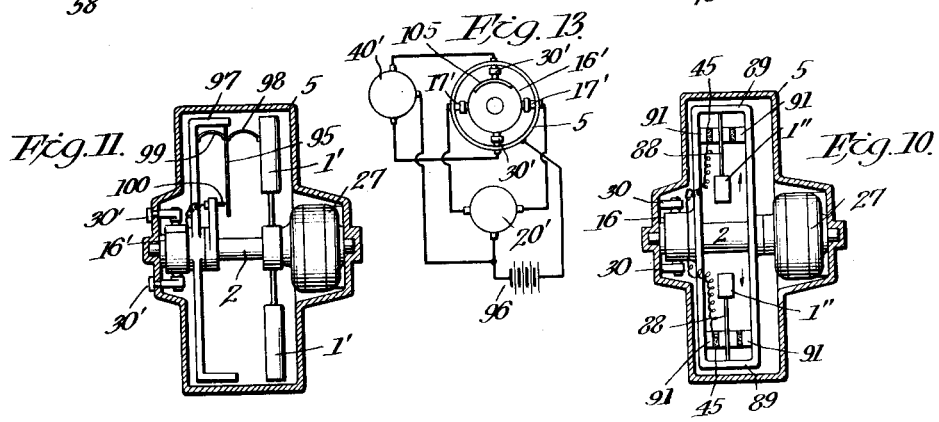
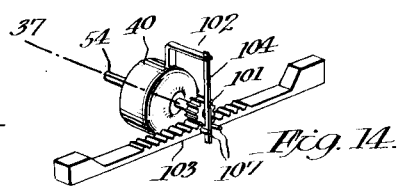
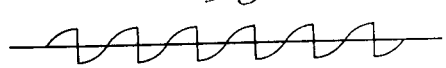

Patented Apr. 21, 1931

1,801,619

UNITED STATES PATENT OFFICE

ESTANISLAO ARREA, OF SAN JOSE, COSTA RICA

GYROSCOPIC COMPASS AND LATITUDE INDICATOR

Application filed March 13, 1928. Serial No. 261,283.

My invention relates to gyroscopic apparatus of the type having the property of placing their axis of rotation parallel to the axis of the earth and it is a wide departure of the methods used in said apparatus.

Another object of the invention is to provide vibratory means to detect the precessional forces.

Another object is to amplify the feeble effects of the precessional forces so as to make it possible to utilize a small apparatus.

Referring to the accompanying drawing in which like numerals designate like parts in all the views:

Figure 1 is an elementary form of my invention (looking downwards).

Fig. 2 shows the same elementary form of Fig. 1 in a different position (looking northwards).

Fig. 3 is a top view of the preferred embodiment of the invention with the top cover of the casing broken away.

Fig. 4 is an elevation of the apparatus with the binnacle and gimbal rings in section.

Fig. 5 shows the apparatus at right angles from Fig. 4.

Figs. 6 and 6a illustrate two forms of the voltage obtained in the device.

Fig. 7 shows another elementary form of my invention.

Fig. 8 is a further elementary form of the invention,

Fig. 9 is a front view of the interior of the casing.

Figs. 10 and 11 are modifications of the invention.

Fig. 12 illustrates the circuit used in the apparatus.

Fig. 13 illustrates the circuit used in the modified form of the apparatus shown in Fig. 11.

Fig. 14 is a method for exerting a gravity torque about the horizontal axis of the device.

Fig. 15 is still a further modification of the apparatus.

It is a well known principle that if a disk or wheel is spinning about an axis which in turn is forced to rotate in a plane at right angles to the plane of rotation of the disk, said disk will have a tendency to rotate in a plane perpendicular both to its spinning plane and to the plane in which the system is forced to rotate. If the system has freedom to yield in the direction of this tendency, the resulting movement is known as precession, and in this case a resistance to the applied force is developed which is known as gyroscopic resistance. If the system has no freedom to yield to the precessional force, no such resistance will be developed. In the first case the system is known as a gyroscope with three degrees of freedom, and in the second as a constrained gyroscope or gyro with two degrees of freedom. If now we consider an element 1 (Figs. 1 and 2) in the form of a cylinder linked resiliently to an axis 2 by means, for instance, of torsional springs 3 (see Fig. 8) which would hold the element 1 at right angles to its axis of rotation 2 it would yield to the precessional force in an amount proportional to said force and to the flexibility of said spring 3. This element or rod 1 constitutes a vibrating unit with a definite period of oscillation. If now we make the period of oscillation equal to the period of rotation, or, in other terms, equal to the time in which the element 1 makes a complete revolution, said vibrating element will be brought into resonance with the precessional alternating impulses to which it is subjected, and thus the maximum speed of said vibrating element will coincide with the maximum precessional force.

To make this clear, let us suppose that the movement at right angles to the plane of rotation of the element 1 is provided by the rotation of the earth. We will assume that said element 1 has been spinning for a certain time while its axis 2 has been participating of the earth's rotation at the equator and that, consequently, said element 1 has been vibrating during said time. This element 1 is seen in two positions; position A (Fig. 2), looking north, and position B (Fig. 1), looking down. It is seen that in position B said element 1 is in a horizontal position, and, at the equator, this position coincides with the point of maximum precessional force and accordingly is where its vibrational speed is a maximum. The direction in which the element 1 is vibrating when passing by position B is, according to the law of precession that indicated by the arrow 9 provided the direction of spinning is that indicated by arrow 10, and its position in relation to its axis of rotation 2 is one at right angles to it.

Since the element 1 has complete freedom to vibrate (assuming that there is no damping) it will not follow the rotation of the earth and consequently, its plane of rotation will remain in the same position as long as said element 1 is in resonance with its speed of rotation. In other words, said element 1 vibrates only in relation to its axis of rotation, but in relation to a fixed point in space, it remains stationary, since the amplitude of its vibration increases in the same magnitude as the angular movement undergone by its axis of rotation 2. This case is illustrated when the element 1 passes by position A where it is making two angles 11 with its axis of rotation 2, different from two right angles by an amount equal to the angular movement undergone by its axis 2 since the element 1 started to vibrate. Said element attains its maximum deflection when passing the plane of rotation of the earth, that is, at ninety degrees from the point of zero deflection and maximum speed. At the equator, when the element 1 is in the aforesaid position A its plane of oscillation coincides with the vertical of the place, since at the equator the plane of rotation of the earth coincides with it. Obviously, this will not be the case at any other latitude because the vertical will not longer coincide with the earth's plane of rotation.

The energy absorbed by the vibrating element 1 is derived from its spinning means and it is proportional to the amplitude of the vibration. The ultimate amplitude of said vibration will depend upon the damping of the element; if the rate of increase of said damping, when the element increases in amplitude, is greater than the rate of increase of the energy absorbed by the element, there will be reached a certain amplitude in which the damping will balance the energy given to the element and consequently, no further increase of amplitude will take place. If the rate of increase of the damping, when the element is increasing in amplitude, were smaller than the rate at which energy is given to the element, the vibration would continue to increase in amplitude indefinitely.

The vibrating element 1 will exert a precessional force on its axis 2 because of its damping, which will be a maximum when said damping balances the energy given to said element, in which case the amount of this precessional force will be equal to the one the element would exert if it were rigid with its axis of rotation.

I already said that the torsional springs 3 linking the element 1 to its axis 2 will tend to hold it at right angles to said axis.

When the element 1 is spinning it will be subjected to centrifugal force which will tend to place it at right angles to its axis 2. That is, in the same position in which the spring tends to place it, because of the fact that it is only in this piston where its centrifugal force has no lateral component. Since this is the position in which the element will tend to place itself, it will be called its neutral position.

From what has been stated above it will be obvious that when the element 1 is displaced from its neutral position its centrifugal force will tend to restore it back to this position, much in the same way as the elasticity of the spring 3 does. In fact, if the mass of the element 1 were concentrated in a mathematical line, or in a strip 47 (Fig. 7) of infinitesimal thickness linked by frictionless pivots or torsionless wires 3' to an axle of rotation 2 (Fig. 7), the centrifugal restoring force would be enough, by itself, to maintain a state of resonance between the period of vibration of said strip 47 and its period of rotation. This is only true for small amplitudes of vibration, because the centrifugal restoring force is proportional to the sine of the angle that the strip makes with its neutral position and not to the displacement from said position, as should be the case to ensure resonance at any vibrational amplitude. For small amplitudes such as this invention is likely to work with, it may be considered that said force is proportional to said displacement, because the sines of small angles vary almost proportionally as said angles, and consequently, a sharp resonance is possible. This will be true for any rotational speed since centrifugal force varies as the square of said speed, and the period of any vibrating system is proportional to the square root of the restoring force existing at a given amplitude.

The thicker this strip 47 is, the smaller will be the tendency of its centrifugal force, for a given mass, of placing it in a definite position with respect to its axis of rotation, until, when it becomes a square 4 (Fig. 8) this tendency is zero. This is also the case for a disk or a sphere, etc. This is obvious since all those forms are symmetrical and the centrifugal forces are thus balanced for any position around their axis of oscillation 48. In those cases as there is no centrifugal restoring force, this force must be wholly provided by resilient means, such for instance, as torsional springs 3.

Though the internal friction losses in a torsional spring are very small, especially for the very small angular movements which will take place in this invention, they can be made still much smaller by making the restoring force to be constituted mostly by centrifugal force. This has also the advantage of making less important the necessity of a very steady rotational speed, because, for a variation in the exact speed required, in a given case, the vibrating masses would be thrown out of resonance to an extent proportional to the relative strength of the spring restoring force compared to that of the centrifugal restoring force. In fact, if, in a given case, the centrifugal restoring force were fifty times as great as the spring restoring force, any variation in speed would affect the period of oscillation one fiftieth of what would be the case if the system considered were provided with only spring restoring force, because of the fact that, as we already pointed out, the centrifugal restoring force is a function of the rotational speed, varing with said speed in the exact proportion required.

In the systems we have described the axis of rotation 2 and of oscillation 48 (see Fig. 8) of the vibrating member or masses intersect one another at right angles. This has been done for the sake of clearness while explaining the principles underlying my invention, but the form of the vibrating member and the means of linking it to its axis of rotation that I now prefer are somewhat different and will now be described with reference to Figs. 3 and 9.

1' are two masses connected to the central, massive part 50 by means of thin strips 51 preferably integral with both parts 1' and 50 which serve as a sort of elastic hinge for the vibrations of the masses 1'. The axis of oscillation lies on the thin strips 51. The central part 50 is a rigid one and its object is to place the axis of oscillation nearer the masses with the purpose of increasing their centrifugal restoring force for the purpose already explained. This increase of centrifugal restoring force is readily understood if we note the fact that the masses 1' together with their means of linking them to the rigid central part 50 are similar to common gravity pendulums but actuated by centrifugal force instead of gravity force; and as the period of oscillation of such pendulums is inversely proportional to the square root of the distance between the center of mass and its axis of oscillation it will be clear that in the case of the masses 1 the same law will be true. Parts 51 are made thin but wide with the object of securing enough section to withstand centrifugal force, yet without making them too stiff so that the spring restoring force be kept small compared to the centrifugal restoring force. Obviously, as many of those masses 1' as desired can be used; I have only used two for the sake of simplicity throughout this specification.

I will now illustrate the means and method with which the axis 2 will seek to place itself parallel to the axis of the earth with means controlled by the vibrations of the masses 1'. Reference is made to Figs. 3, 4, 5, 9 and 12, where, 12 is a double magnet rigid with the axis 2 and rotating with it having a part of its four arms 13 near the vibrating masses 1'. Four coils 15 are wound on said double magnet 12, which can be connected in series or parallel. Each of the two ends e, e (Fig. 12) of those coils 15 is connected to a segment of the two segment commutator 16 which is rigid with the axis 2. 17 and 30 are two pairs of brushes fixed on the casing 5 and placed at ninety degrees from one another. 27 is the stator of an electric motor, rigid with the casing 5. The corresponding rotor is fixed to the axis 2. The casing 5 is non-pendulous and is mounted in ball bearings, by means of trunnions 54, on the vertical ring 7. 56 is an outer vertical ring having a ball bearing in its lower part in which is pivoted a member 57 which is stabilized by a small gyroscope 58 against any movement in azimuth that the pivot 59 might transmit to it. Said gyroscope 58 is free to precess around a horizontal axis 61 and is held in a definite position by a weak spring 62. A mass 60 balances the weight of the gyroscope 58. The inner vertical ring 7 is pivoted in turn by means of the spindle 64 rigid with said ring 7 to a bearing 63 fixed on the stabilized member 57. Between said member 57 and the spindle 64 there is a spring 69 which will hold the member 57 in a definite position in relation to said spindle 64 and consequently, to the vertical ring 7. The outer vertical ring 56 is mounted in ball bearings 65 on the horizontal ring 66 which in turn is carried by another ring 67 fixed to the binnacle 68. Both vertical rings are stabilized by the horizontal gyroscope 55 and they are made pendulous.

Rigid with the casing 5 is the casing 29 of a gyro wheel which we will suppose it is spinning in a contrary direction to that of the axis 2, the weight and speed of which is so proportioned as to neutralize the gyroscopic characteristics of the spinning masses rigid with said axis 2, and consequently the system will not develop any gyroscopic resistance to any applied force.

20 (Fig. 4) is an azimuth motor, the armature of which is rigid with the outer vertical ring 56 by means of brackets 106, and the corresponding rotor (not shown) with the spindle 64 rigid in turn with the vertical ring 7. The armature of the latitude motor 40 is rigid with the vertical ring 7 and the corresponding rotor (not shown) with casing 5. Both motors are for direct current and they must be so designed that their direction of rotation will depend upon the direction of the current.

The compass card 71 is fixed to the spindle 70 rigid with the vertical ring 7, and the lubber line is affixed to bracket 72. The latitude card 73 is carried by trunnion 54. Two brackets 74 fixed to the inner vertical ring 7 form the reference points for reading the latitude, which will be equal to the angle comprised between a line joining those two brackets 74 and the zero latitude line on the card 73. The binnacle 68 can be rotated in azimuth so that the latitude card 73 may always be read through glass 108. The means are not shown.

When the masses 1' vibrate the distance 18 between said masses and the arms 13 of the double magnet 12 will vary, changing the permanence of the magnetic circuit and therefore an alternating voltage will be induced in the coils 15. This voltage will be in phase with the vibrations of the masses 1' being a maximum when their vibrational speed in a maximum and vice versa.

Current collected by brushes 17 and 30 is transmitted to two amplifying sets, 21 and 22, and from there to the motors 20 and 40. Two circuits are thus formed, 23 and 24, which I call the azimuth and latitude circuits respectively. To diminish the required amplification any kind of sensible relays could be used such as polarized relays, resonance relays, etc.

If now we assume that the masses 1' (Fig. 3) are vibrating at the equator with their axis of rotation 2 in a horizontal position and with theirs north seeking end 200 pointing toward the east, there will be created an alternating voltage which will be rectified by the two segment commutators 16 and by brushes 17, because said brushes will change from one segment to another in the precise moment in which the induced voltage is zero; that is, when the vibrating masses 1' pass by the vertical (position A, Fig. 2). The curve followed by said rectified voltage is shown in Fig. 6 and it is known in the art as a pulsating voltage. When the voltage in the azimuth circuit follows the curve shown in Fig. 6 that of the latitude circuit will follow the curve shown in Fig. 6a because the brushes 30 will change from one segment of the commutator to another in the precise moment in which the voltage is a maximum (position B, Fig. 1) and for this reason there will be in this circuit an alternating broken voltage which will force an alternating current through the motor 20 which will not affect it. This must be the case at the equator when the axis 2 is in a horizontal position, because at the equator the axis of the earth is parallel to the horizontal and consequently no correction must take place in the latitude motor. The rectified voltage of the azimuth circuit 23 will force a current through the azimuth motor 20 which will develop a torque which will make the north seeking end 200 of the axis 2 to rotate about the vertical axis 38 in the direction indicated by the arrow,—but as soon as it begins to move, the vibrating masses 1' will start to vibrate about the horizontal axis, thus inducing a voltage which will be rectified by brushes 30 because those brushes are in the same position in relation to movements of the system around the vertical axis 38 as brushes 17 are in relation to movements of the system about the horizontal axis 37 (or about the rotation of the earth). This rectified voltage will force a current through the latitude motor 40 which will develop a torque which will make the horizontal axis 37 (Fig. 3) to rotate in a direction opposite to the rotation of the earth, and thus will tend to stop and reverse the vibration that the earth's rotation is causing to the masses 1'. Now, as soon as this vibration is stopped or weakened, the movement in azimuth which was its result, will too be stopped or weakened, and therefore, the torque opposed to the rotation of the earth, which in turn was a result of the movement in azimuth, will be equally stopped or weakened. As soon as the torque opposed to the rotation of the earth is weaker than the torque that said rotation of the earth exerts through friction in the trunnion 54 on the casing 5, said casing will begin to pick up the earth's rotation and consequently the vibration of the masses 1' will begin to increase, wherefrom the same process will begin to take place again, until the axis 2 is parallel to the axis of the earth.

If the end 200 of the axis 2 were pointing toward the west instead of east the phase of the alternating current would differ 180 degrees from the phase of the current induced when said end 200 is pointing east and consequently the polarity of the rectified current would be reversed, obviously reversing the direction of the orientating movement.

The action that takes place is similar to the one taking place in a common gyroscopic compass, in that an angular movement or torque will cause another angular movement or torque at right angles to the first one, but this is accomplished in my invention through the torque of the orientating motors controlled by the vibrations of the masses 1' and not directly by precession as is the case in said gyroscopic compasses. If now we assume that the gyro wheel enclosed in casing 29 is stationary there will be some precessional force developed in said axis due to its own mass and that of the masses rigid with it, we will observe that the same action will take place because the precessional torques will be in the same direction of the torques exerted by both motors. That is, the rotation of the earth will develop a precessional force in the same direction as the torque of the azimuth motor 20. This precessional torque will not be strong enough, by itself, to rotate the apparatus about its vertical axis 38 (Fig. 4). Said rotation is accomplished by the torque of the motor 20. This latter rotation will develop a precessional force which will be opposite in direction to the rotation of the earth, that is, in the same direction of the torque of the latitude motor 40. This latter movement in azimuth is possible, notwithstanding the gyroscopic characteristics of the axis 2, because of the torque that the rotation of the earth exerts, through friction in trunnions 54 on the axis 2 against the precessional force developed by said movement in azimuth.

If in the bearings there were only "fluid friction" the orientating process would be a continuous one, but it is doubtful if with a "solid friction" a steady movement can take place, because at such exceedingly low speeds static friction is present and irregular differences in the amount of friction are liable to arise.

In parallel with both circuits there are two galvanometers 76 and 77 which will indicate their voltage and polarity at every moment, and they are so marked as to suggest the direction in which the axis 2 is out of parallelism with the axis of the earth. For example: if the needle of the galvanometer 76 is deflected toward the "W" it is an indication that the true north is west of the one indicated on the card 71 and vice versa. Likewise, if the needle of the latitude galvanometer 77 is deflected toward the "S", it will be an indication that the true latitude lies at the south of the one indicated on the card 73.

One advantage derived from the fact of knowing the position of the north-south axis 200—300 is the addition of hand orientating means as follows: A direct current from a source 78 may be sent in any direction, to each of the motors 20 and 40 by means of the distributor 79. Said distributor is lettered to correspond with the letters on the galvanometers, so that, when the needle of a galvanometer is pointing, for example, toward the "W" the connector 80 of the distributor will be placed in this position and the right correction will take place. All movements are made in this case through precession and thus the latitude corrections will be made by the azimuth motor and vice versa.

Four pairs of rings $a$, $b$, $c$, and $d$, fixed to the spindle 70, and four pairs of corresponding brushes $a'$, $b'$, $c'$, and $d'$ fixed to the outer vertical ring 56, are the means with which current leaves and enters the system.

I will now describe a few other forms of the fundamental principles which constitute my invention.

The precessional alternating forces can also be detected by placing, between the vibrating masses 1' and an arm 43, (see Fig. 15) rigid with the axis 2, (not shown in this view) a tourmaline, quartz, or any other crystal 91 which, when compressed, develops an electric voltage. The crystals are extremely sensitive, and have been the subject of careful investigations. The electricity produced in this way is known in the art as piezo-electricity. By making the period of oscillation of those crystals equal to the period of the precessional forces resonance would result, and the voltage developed, would be greatly magnified. The faces of said crystal 91, which are against the arm 43, and the mass 1', might be a pole, and the other pole would be a girdle 45, encircling the crystal as shown. The rest of the circuit would be equal to the ones already described.

Another method of detecting the vibrations of the masses 1' would consist in a light rod 95 (Figs. 11 and 13) connected to a pole of a direct current source 96, and fixed to an arm 97, rigid with axis 2. Said rod is tuned to vibrate at a frequency equal to that of the masses 1' (equal to the number of revolutions of said masses 1' per second) and it is coupled to one of the masses 1' by means of a wire 98 which will be tightened when spinning, by centrifugal force, and which is balanced by an equal wire 99. When the rod vibrates and acquires sufficient amplitude it will make contact at 100, thus closing the circuit leading to a commutator 16' having a single segment 105 of about ninety degrees in circumference. Two pairs of brushes 17' and 30' rest on said commutator 16' to collect the current therefrom. Brushes 17' control the azimuth motor 20', and brushes 30' the latitude motor 40. Both motors should have a pole permanently connected as shown, and their direction of motion will depend upon which of the other two poles is energized. We already know that this will depend, in turn, on the position of the axis 2 in relation to the axis of the earth. The energy of vibration of the mass 1' will be transmitted to the rod 95 and, as this rod is much lighter than the said mass 1', its amplitude will necessarily be greater.

If a rotating mass 1'' (Fig. 10) is mounted in such a way that its centrifugal force makes a compressional stress, instead of a tension stress, as is the case with masses 1', this centrifugal force would be opposed to the restoring force of the spring, contrary to what is the case with said masses 1'. Fig. 10 shows two masses 1'' mounted in this way, which are supported by flexible members 88 from the periphery end of a frame 89 rigid with the axis of rotation 2. It will be obvious that, if said masses 1'' are perfectly symmetrical in relation to its supporting member 88, their centrifugal force will not have any lateral component and thus will not tend to move them; but if said masses are displaced laterally by any cause, their centrifugal force will acquire a lateral component which will aid to displace them further. It is clear then, that if the masses 1" are wanted to vibrate at the frequency of their rotational speed, the restoring force of the supporting member 88, must be stronger in an amount equal to the centrifugal opposing force and thus, the lateral pressures made by said member 88, will be greater than would be the case if the centrifugal restoring force would not oppose the spring restoring force. Said pressures can be detected by holding the member 88 laterally with two sensible crystals 91 already referred to. In this way, a very sensitive and effective means of detecting the vibrations of the masses 1" is made possible.

When the vibrating masses are provided with spring restoring force and are vibrating, there will be an alternating reaction on their axis of rotation due to the fact that the spring takes support on said axis. The number of alternations of said reaction will be double the number of turns or vibrations made by said masses. Fig. 8 illustrates this case. The mass 4 provided only with spring restoring force, by means of torsional springs 3, will exert the reaction just referred to, on the axis 2, which might be detected for instance by placing sensible crystals 91 under the bearings 92 of the axis 2.

A method of exerting a torque on the horizontal axis 37 different from the one already described, would consist in a motor 40 rigid with one of the trunnions 54 of the casing 5, and equal in design to the ones already referred to, with a pinion 101 fixed to its shaft, and engaging a rack 102 with a certain weight. Said rack would be placed in a definite position by means of a spring 104, engaging two pins 107. When the motor rotates it will displace the rack 103 from its neutral position, displacing at the same time the center of gravity of the system, and consequently exerting a gravity torque on the axis 37.

Although I have described the invention as applied to a gyroscopic compass and latitude indicator, other applications are possible within its scope, and I will now describe one of them.

If the current collected by brushes 17 (when the casing is given an angular movement) is transmitted to the motor 40 so that the torque of said motor be opposed to the rotation of the casing 5, said casing would not follow the earth rotation, and consequently would remain approximately fixed in space. The same object can be accomplished in a more effective way by using the casing with the make-and-break contact system shown in Fig. 11. In this case by making the torque of the motor used to be opposed to any angular movement which closes the circuit energizing said motor, a hunting motion would result (assuming there is no gyroscopic characteristics in the system) and the casing would remain practically stationary even if the torque of the motor is stronger in one direction than in the other, because in a hunting system both the speed and amplitude of the vibrations tend to be equal in both directions and consequently the resulting yield of the plane of rotation of the masses 1', due to their damping, would be nil.

Some of the advantages of my invention are its great sensibility, which is made possible because of the resonance existing between the vibrating masses and the precessional forces; the fact that it is both a compass and latitude indicator, and its comparatively small weight.

Due to the fact that the casing is non-pendulous, accelerations will not affect it, and, since the oscillations of the vertical pendulous rings can only be transmitted to said casing by friction which is small, the errors arising therefrom are negligible. Also, since the period of oscillation is short, and the error made by a half oscillation is neutralized by the other half, the resulting deflection is necessarily very small.

What I claim is:

1. In gyroscopic apparatus, an axle of rotation, means for rotating same, masses rotating with said axle, means to resiliently mount said masses on said axle and means to detect its precessional force of said masses in its alternating form.

2. In gyroscopic apparatus, an axle of rotation, means to rotate same, masses rotating with said axle, means to resiliently mount said masses on said axle; the period of vibration of said masses being substantially equal to their period of rotation.

3. In gyroscopic apparatus, an axle of rotation, means to rotate same, masses rotating with said axle, means to resiliently mount said masses on said axle, the period of vibration of said masses, in a plane normal to their plane of rotation being substantially equal to their period of rotation, and means for detecting the vibrations of said masses resulting from the alternating impulses of precession.

4. In gyroscopic apparatus, an axle of rotation, means to rotate same, masses rotating with said axle, means to mount said masses on said axle, the period of vibration of said masses, in a plane normal to their plane of rotation, being substantially equal, to their period of rotation, and means for detecting the vibrations of said masses resulting from the alternating impulses of precession, developed by angular movements of their axis of rotation in a plane normal to its plane of rotation.

5. In a gyroscopic compass and latitude indicator an axle of rotation, means to rotate same, masses rotating with said axle, means to resiliently mount said masses on said axle, the period of vibration of said masses in a plane normal to their plane of rotation being substantially equal to their period of rotation and means, mounted on the axle of rotation of said masses, to detect the vibrations resulting from precessional forces developed by the rotation imparted to the system by the rotation of the earth when the axis of rotation of said masses is not parallel to the axis of the earth.

6. In a gyroscopic compass and latitude indicator, an axle of rotation, means to rotate same, masses rotating with said axle, means to resiliently mount said masses on said axle, the period of vibration of said masses being substantially equal to their period of rotation, said masses being vibrated by the alternating impulses of precession resulting from the rotation imparted to the system by the rotation of the earth when the axis of rotation of said masses is not parallel to the axis of the earth, and means controlled by said vibrations, to place the axis of rotation of said masses, parallel to the axis of the earth.

7. In a gyroscopic compass and latitude indicator, a casing mounted in neutral equilibrium, adapted to move about a horizontal and a vertical axis, on a Cardan pendulous system, a motor for imparting angular movements to said casing about the horizontal axis, a motor for imparting angular movements to said casing about the vertical axis, an axle pivoted for rotation in the casing, means for spinning same, masses rotating with said axle, means to resiliently mount said masses on said axle, the period of vibration of said masses in a plane normal to their plane of rotation, being substantially equal to their period of vibration, said masses being vibrated by the alternating impulses of precession resulting from the rotation imparted to the system by the rotation of the earth, when the axis of rotation of said masses is not parallel to the axis of the earth, means mounted on the axle of rotation of the masses capable of generating an electric current when the masses vibrate, means to collect and rectify the current generated when the vibrations take place about the horizontal axis, means to amplify and relay said current and transmit it to the motor for movements about the horizontal axis, means to collect and rectify the current generated when the vibrations take place about the vertical axis, means to amplify and relay said current and transmit it to the motor for movements about the vertical axis.

8. In a gyroscopic compass and latitude indicator, a casing mounted in neutral equilibrium, adapted to move about a horizontal and a vertical axis, on a Cardan pendulous system, a motor for imparting angular movements to said casing about the horizontal axis, a motor for imparting angular movements to said casing about the vertical axis, an axle pivoted for rotation in the casing, means for spinning same, masses rotating with said axle, means to resiliently mount said masses on said axle, the period of vibration of said masses in a plane normal to their plane of rotation, being substantially equal to their period of vibration, said masses being vibrated by the alternating impulses of precession resulting from the rotation imparted to the system by the rotation of the earth, when the axis of rotation of said masses is not parallel to the axis of the earth, means mounted on the axle of rotation of the masses capable of generating an electric current when the masses vibrate, means to collect and rectify the current generated when the vibrations take place about the horizontal axis, means to indicate the polarity of said current, means to amplify and relay said current and transmit it to the motor for movements about the horizontal axis, means to collect and rectify the current generated when the vibrations take place about the vertical axis, means to indicate the polarity of said current, means to amplify and relay said current and transmit it to the motor for movements about the vertical axis.

9. In a gyroscopic compass and latitude indicator, a casing mounted in netural equilibrium, adapted to move about a horizontal and a vertical axis, on a Cardan pendulous system, a motor for imparting angular movements to said casing about the horizontal axis, a motor for imparting angular movements to said casing about the vertical axis, an axle pivoted for rotation in the casing, means for spinning same, masses rotating with said axle, means to resiliently mount said masses on said axle, the period of vibration of said masses in a plane normal to their plane of rotation, being substantially equal to their period of vibration, said masses being vibrated by the alternating impulses of precession resulting from the rotation imparted to the system by the rotation of the earth, when the axis of rotation of said masses is not parallel to the axis of the earth, means mounted on the axle of rotation of the masses capable of generating an electric current when the masses vibrate, means to collect and rectify the current generated when the vibrations take place about the horizontal axis, means to indicate the polarity of said current, manual means to operate the motor for movements about the horizontal axis in accordance with said indications so as to place the axis of rotation of the masses parallel to the axis of the earth, means to collect and rectify the current generated when the vibrations take place about the vertical axis, means to indicate the polarity of said current, manual means to operate the motor for movements about the vertical axis in accordance with said indications, so as to place the axis of rotation of the masses parallel to the axis of the earth.

10. In a device of the class described, masses mounted for rotation about an axis, means to spin them, means to give them a period of vibration, in a plane normal to their plane of rotation substantially equal to their period of rotation, said masses being vibrated by the precessional forces developed when their axis of rotation is given an angular movement at right angles to its plane of rotation, and means, controlled by said vibrations for rotating the system in any direction at right angles to the plane of rotation of said masses.

11. In a device of the class described, masses mounted for rotation about an axis, means to spin them, means to give them a period of vibration in a plane normal to their plane of rotation equal, or approximately equal, to their period of rotation, said masses being vibrated by the precessional forces developed when their axis of rotation is given an angular movement at right angles to its plane of rotation, and means, controlled by said vibrations for applying a torque to the system opposing said angular movement.

In testimony whereof I affix my signature.

ESTANISLAO ARREA.